(12) United States Patent
Fujinaga

(10) Patent No.: US 6,374,049 B1
(45) Date of Patent: Apr. 16, 2002

(54) VIBRATION PREVENTION APPARATUS

(75) Inventor: Nobuhiro Fujinaga, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,495

(22) Filed: May 12, 2000

(30) Foreign Application Priority Data

May 17, 1999 (JP) .......................................... 11-135597

(51) Int. Cl.$^7$ .............................................. G03B 17/00
(52) U.S. Cl. ....................................................... 396/55
(58) Field of Search .......................... 396/55; 348/208; 359/554, 557

(56) References Cited

U.S. PATENT DOCUMENTS 5,946,032 A * 9/1999 Ishizuka et al. ............ 348/208

FOREIGN PATENT DOCUMENTS

JP          0014213     * 8/2001

* cited by examiner

*Primary Examiner*—W. B. Perkey
(74) *Attorney, Agent, or Firm*—Fitzpatrick, Cella, Harper & Scinto

(57) ABSTRACT

A vibration prevention apparatus includes a holding member for holding an optical unit for correcting image blur, a support member for movably supporting the holding member, a coil member provided on the holding member, a magnet member provided on the support member, and disposed in opposed relationship with the coil member, and a member disposed between the coil member and the magnet member, and having electrical conductivity, wherein the coil member is electrically energized, whereby the holding member is driven relative to the support member, and when the holding member is driven by vibration, an eddy current is generated in the electrically conductive member and magnetic friction is created, and the electrically conductive member performs the role of a damper.

10 Claims, 10 Drawing Sheets

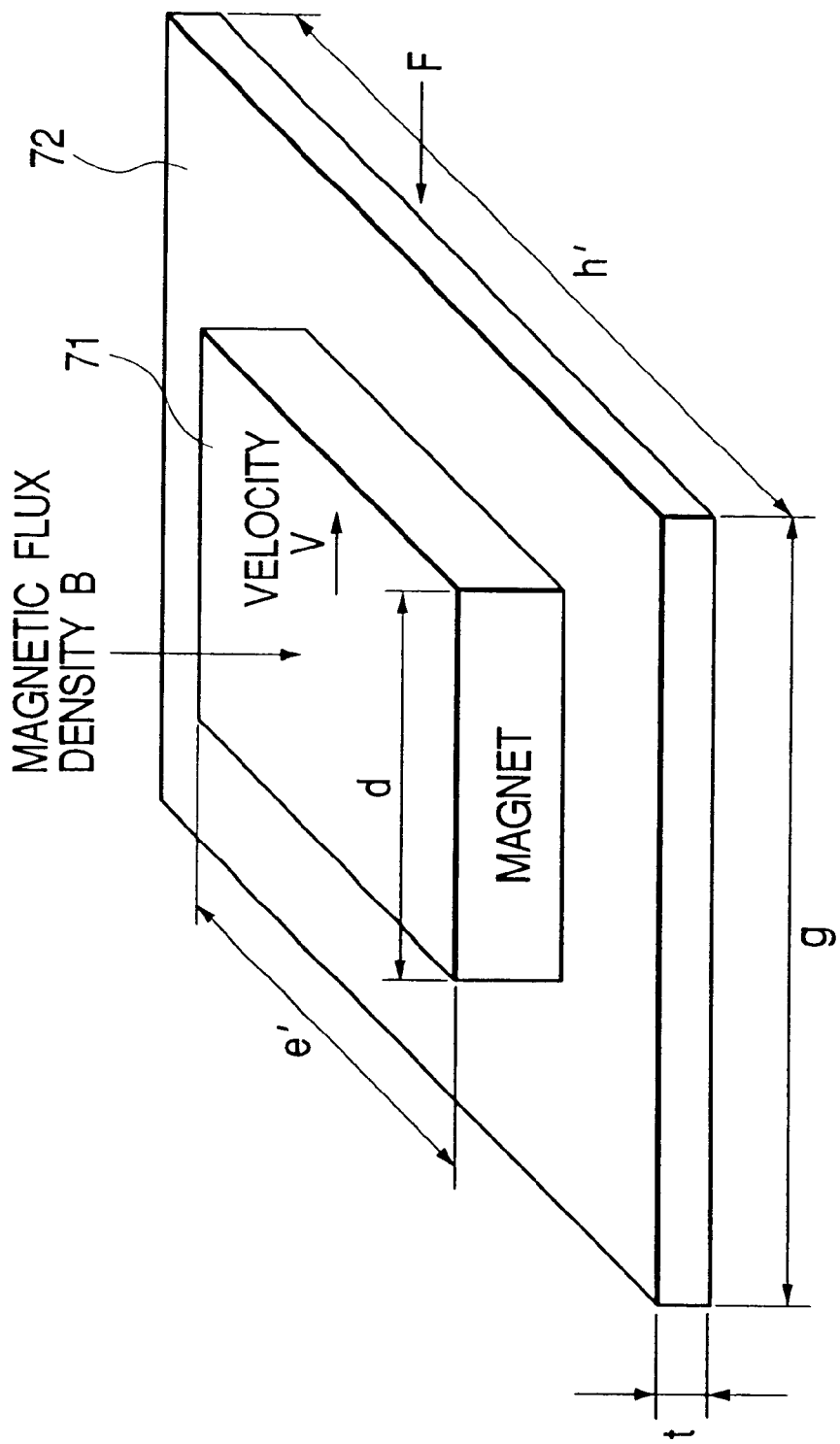

VIBRATION PREVENTION APPARATUS

BACKGROUND OF THE INVENTION

1. Field of the Invention

This invention relates to improvements in an actuator for a vibration prevention apparatus provided with a coil and a magnet.

2. Related Background Art

A system for preventing a hand fluctuation applied to a camera has heretofore been studied and there is one already carried on a product and put into practical use. Here, a system for preventing hand fluctuation will be briefly described.

Hand fluctuation of a camera during photographing usually is a vibration of a frequency of 1 Hz to 12 Hz, and as a basic idea for making a photograph free of image blur photographable even if such a hand fluctuation is caused at the point of release of a shutter release time, the vibration of the camera by the above-described hand fluctuation must be detected and in conformity with the detected value, a correction lens must be displaced. Accordingly, to make a free of image blur photographable even if hand fluctuation occurs, it is necessary to first detect the vibration of the camera accurately, and then to correct the variation in the optical axis due to the vibration of the camera.

Theoretically speaking, the detection of this vibration (camera vibration) can be accomplished by carrying on the camera a vibration detecting sensor for detecting acceleration, velocity or the like, and means for electrically or mechanically integrating the output signal of the vibration detecting sensor and outputting displacement. On the basis of this detected information, correcting optical means (comprising a correction lens and a fixed frame or the like for holding the correction lens) in a vibration prevention apparatus carried to make the photographing optical axis eccentric is controlled (the correction lens is displaced), whereby image blur correction becomes possible.

FIG. 10 of the accompanying drawings is an exploded perspective view of a vibration prevention apparatus used in the vibration prevention system of an interchangeable lens for a single-lens reflex camera. FIG. 11 of the accompanying drawings is a detailed view of the portion X (stepping motor unit) of FIG. 10. The epitome of the vibration prevention apparatus will hereinafter be described with reference to these figures.

This is a system in which a holder 101 holding a correction lens (not shown) is moved on a plane perpendicular to a photographing optical axis L by a driving force generated by coils 105p, 105y and magnets 107p, 107y to thereby correct camera vibration.

The reference 103 designates a restraining member in which two slots 103f and 103g formed about the photographing optical axis L are fitted on projections, not shown, projected from a ground plate 102, and the output of the stepping motor unit X which will be described later is transmitted to a gear portion 103a, whereby the restraining member 103 is rotated, and projected portions 101a to 101d (only two of which are seen in FIG. 10) provided at four locations on the holder 101 abut against the cam portions 103b to 103e, respectively, of the restraining member 103 so as to lock (restrain) the correction lens at a predetermined position. This is because when the vibration prevention apparatus is not being driven, the correction lens (and the holder 101) are swayed by the vibration or the like by the disturbance during the carrying of the camera, strike against the ground plate or the like, and make a crashing sound. In order to avoid being swayed, striking against the ground plate, making the crashing sound, and the damage thereby, it is necessary to provide a lock mechanism for holding the direction lens at a predetermined position during the non-operation of the apparatus.

The reference numeral 106 denotes a hard substrate (printed substrate) having mounted on its back photoreflectors 112p and 112y for the detection of positions corresponding to the movement positions of pitch and yaw on the holder 101 side, and having mounted thereon the terminal of the stepping motor unit X which will be described later, the terminals of coil units 105p and 105y and further, elements or the like concerned in the control of these. The reference characters 111p and 111y designate target members for position detection, and the target members 111p and 111y are printed with black and white patterns so that the outputs of the photoreflectors 112p and 112y may vary at a constant rate in conformity with the position of the correction lens.

The reference character X denotes a stepping motor unit of the conventional two-phase type, the reference characters 116a and 116b designate stator yokes obtained by piling up a plurality of metallic plates of a soft magnetic material and securing to one another, and the reference characters 115a and 115b denote coil for exciting the stator yokes 116a and 116b. The reference numeral 114 designates a rotor made of a plastic magnet rotatable by the excited state of the stator yokes 116a and 116b, and the outer periphery thereof is divisionally and alternately magnetized. The reference numeral 113 denotes a motor case lid which effects the positioning of the stator yokes 116a, 116b, the rotor 114 and the coils 115a, 115b, and is fixed to the ground plate 102 and forms the stepping motor unit X. A gear portion 114a provided on the rotor 114 meshes with the gear portion 103a of the restraining member 103 and the restraining member 103 is rotated to thereby lock the holder (correction lens) 110 as previously described.

In the aforedescribed vibration prevention apparatus according to the prior art, the position of the correction lens is always detected to perform an accurate correction driving and the output thereof is fed back. Also, as previously described, when the vibration prevention apparatus is not being driven, the correction lens or the like is swayed by the vibration or the like by the disturbance during the carrying or the like of the camera, strikes against the ground plate or the like, and makes a crashing sound. In order to avoid being swayed, striking against the ground plate, making a crashing sound, and the damage thereby, it has been necessary to provide a lock mechanism for locking the correction lens at a predetermined position. Therefor, a position detecting sensor for detecting the position of the correction lens and a part for locking the correction lens must be added, and this has led to disadvantages such as an increased cost and the enlargement of the size of the apparatus. Particularly, when an attempt is made to carry the vibration prevention apparatus on a compact camera or the like, the enlargement of the size of the apparatus as previously noted is fatal.

SUMMARY OF THE INVENTION

It is a first object of the present invention to provide a vibration prevention apparatus of which the enlargement of the size and complication of an apparatus can be prevented, the vibration can be suppressed with good accuracy, and the destruction by vibration or the like can be prevented.

It is a second object of the present invention to provide a vibration prevention apparatus in which the control of the gap between a coil and a magnet can be done easily.

The vibration prevention apparatus of the present invention has:

a holding member for holding an optical unit for correcting an image blur;

a support member for movably supporting the holding member;

a coil member provided on the holding member;

a magnet member provided on the support member, and disposed in opposed relationship with the coil member; and a member disposed between the coil member and the magnet member, and having electrical conductivity;

wherein the coil member is electrically energized, whereby the holding member is driven relative to the support member.

Or conversely, the vibration prevention apparatus of the present invention has:

a holding member for holding an optical unit for correcting image blur;

a support member for movably supporting the holding member;

a magnet member provided on the holding member;

a coil member provided on the support member, and disposed in opposed relationship with the magnet member; and a member disposed between the coil member and the magnet member, and having electrical conductivity;

wherein the coil member is electrically energized, whereby the holding member is driven relative to the support member.

When the holding member is driven by vibration an eddy current is generated in the electrically conductive member, and magnetic friction is caused. Thus, the electrically conductive member performs the role of a damper.

A further feature of the present invention is that the vibration prevention apparatus has an optical axis, and the holding member is biased relative to the support member by a plurality of biasing members. The optical unit is adapted to be maintained about the optical axis.

Also, the member having electrical conductivity is formed of a non-magnetic material.

Also, the member having electrical conductivity is a metallic plate.

Also, the member having electrical conductivity is fixed to the support member, or holding member.

Further features of the present invention will become apparent from the following description of some embodiments of the present invention.

BRIEF DESCRIPTION OF THE DRAWINGS

FIG. 7 is an illustration of an eddy current in the vibration prevention apparatus according to the first embodiment of the present invention.

DETAILED DESCRIPTION OF THE PREFERRED EMBODIMENTS

Figure 1:
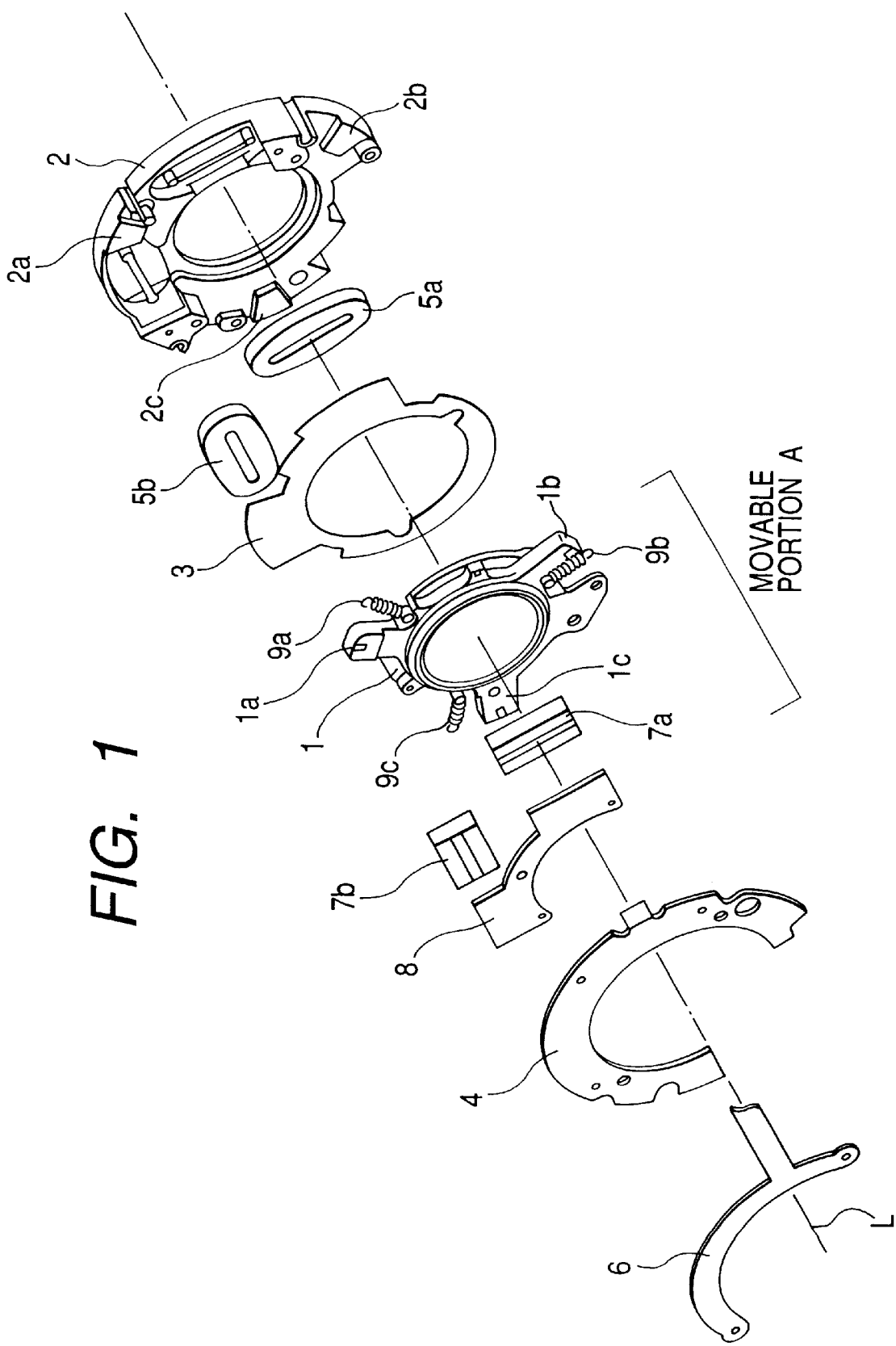
FIG. 1 is an exploded perspective view of a vibration prevention apparatus having an actuator for a vibration prevention apparatus according to a first embodiment of the present invention.

The invention will hereinafter be described in detail with respect to some embodiments thereof shown in the drawings.

Figure 2:
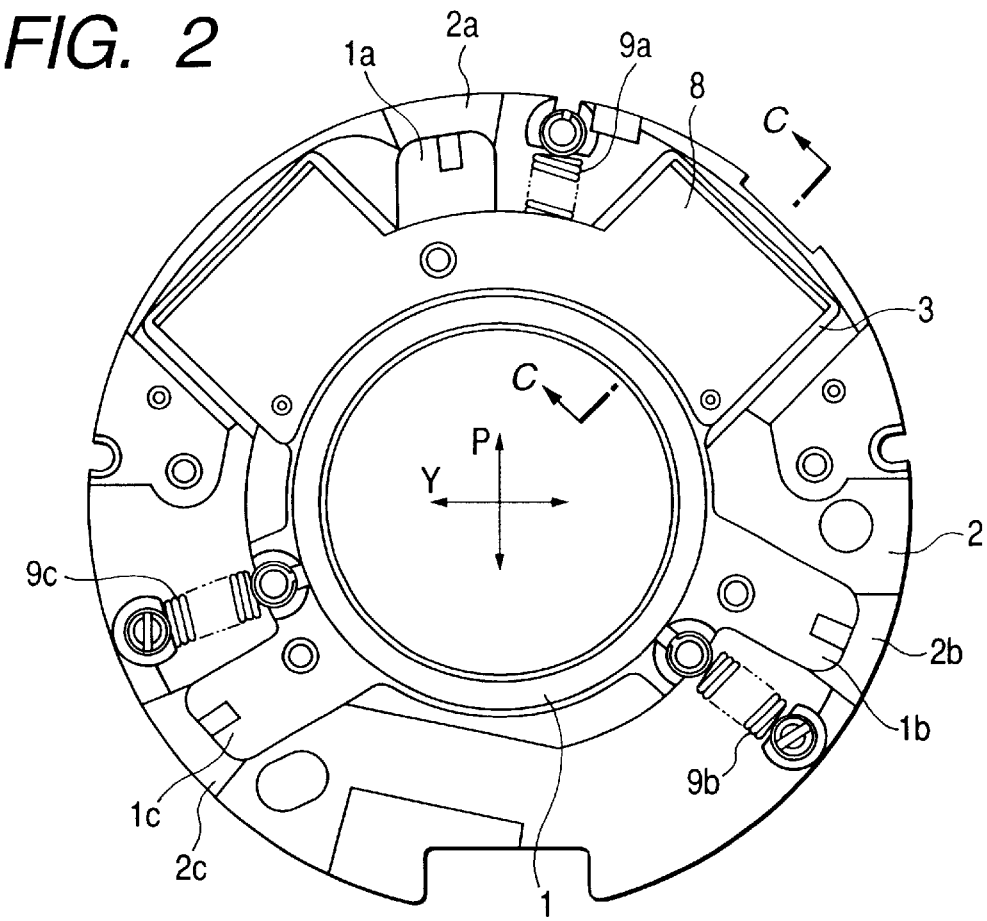
FIG. 2 is a front view of the apparatus of FIG. 1.
Figure 3:
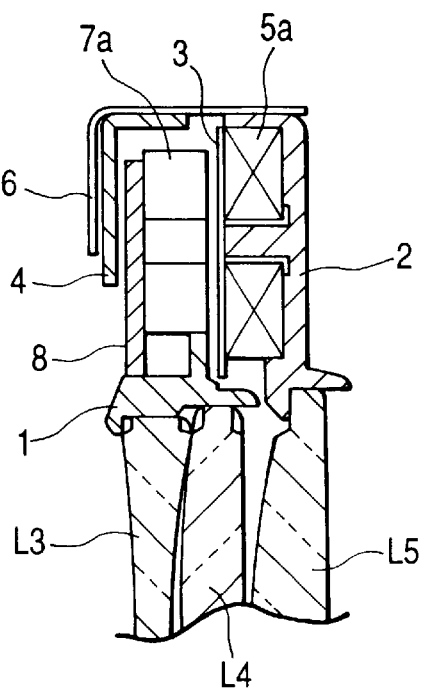
FIG. 3 is a fragmentary cross-sectional view of the apparatus of FIG. 2.
Figure 4:
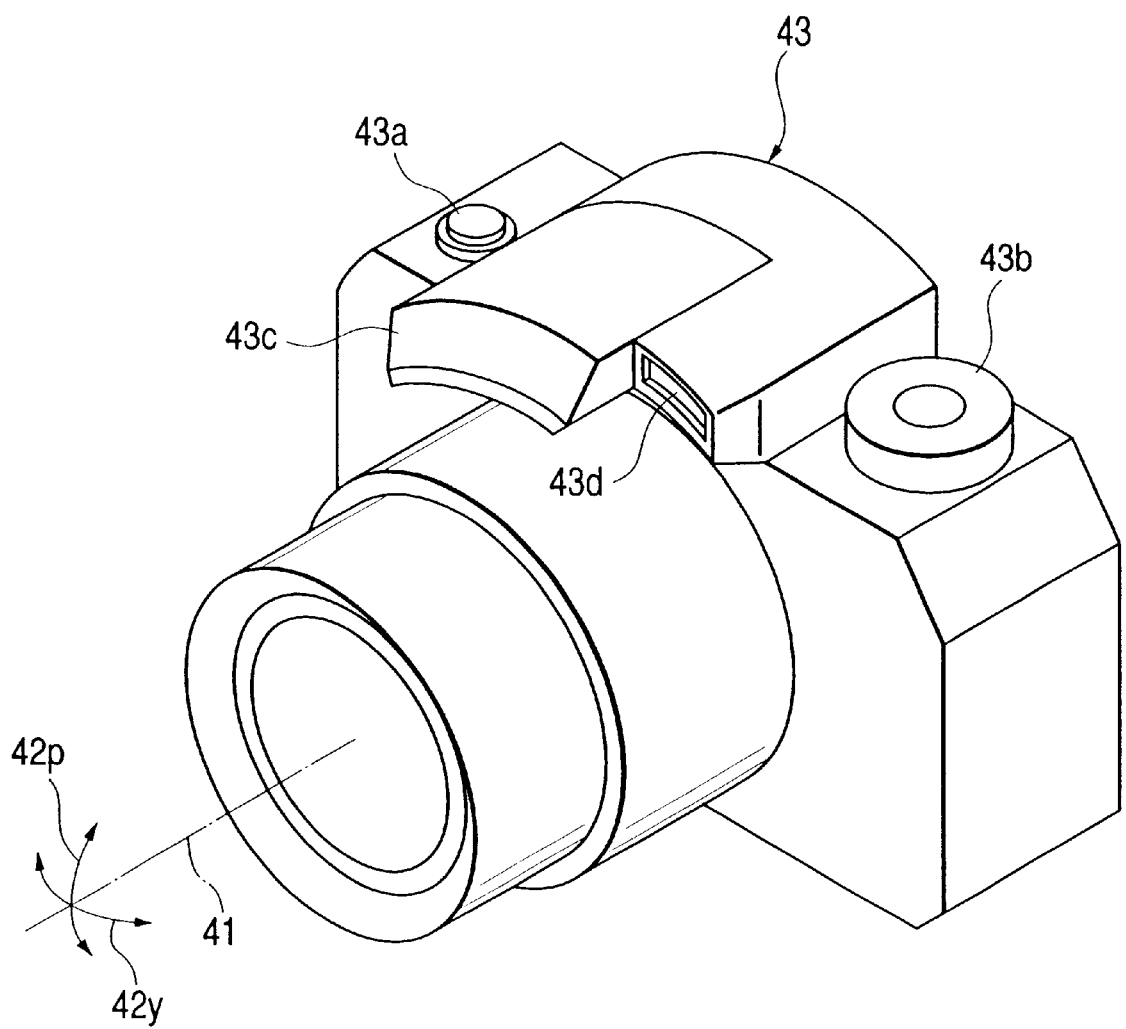
FIG. 4 is a pictorial view of a compact camera having the vibration prevention apparatus of FIG. 1.
Figure 5:
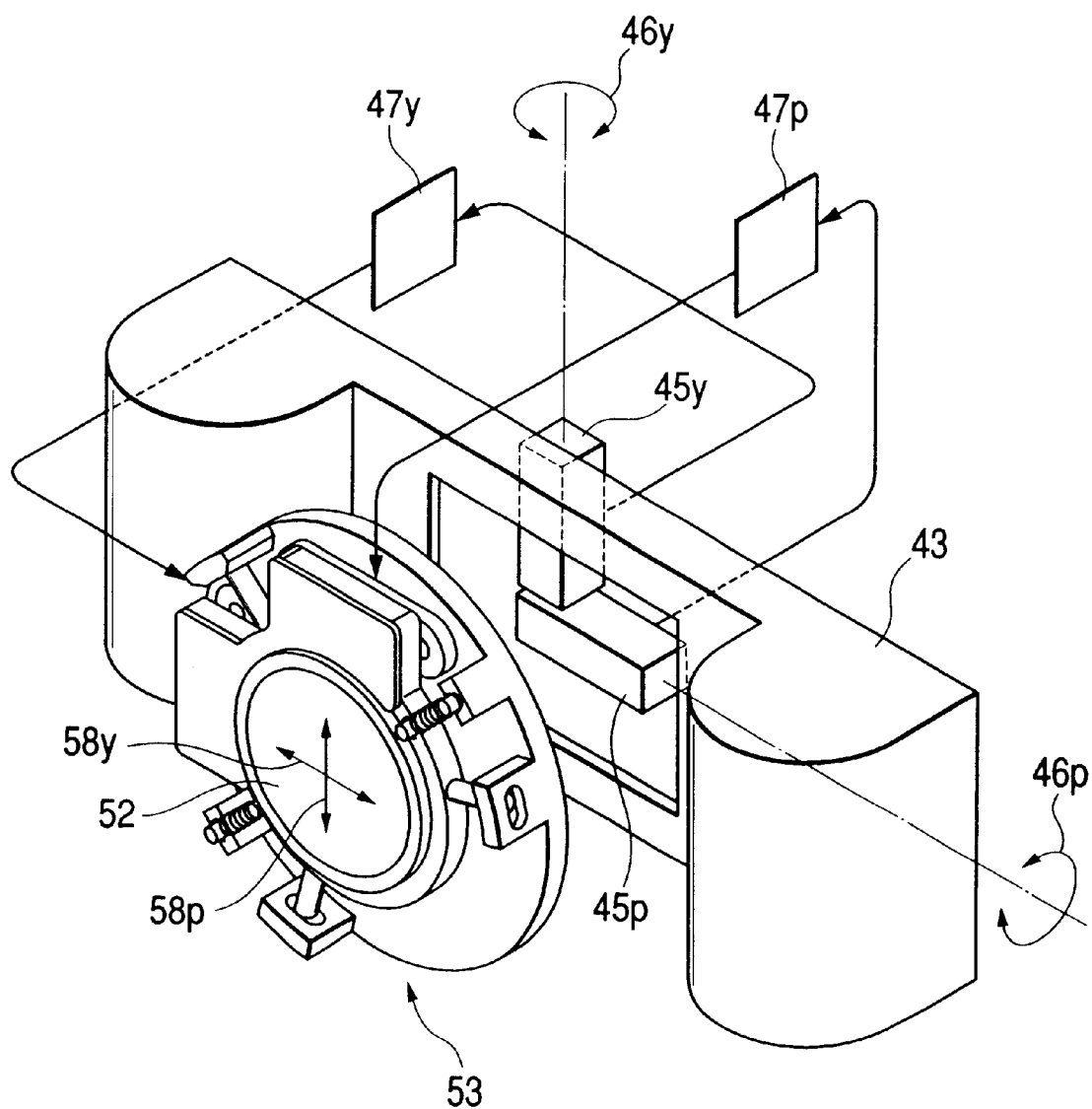
FIG. 5 is a perspective view showing the internal construction of the camera of FIG. 4.
Figure 6:
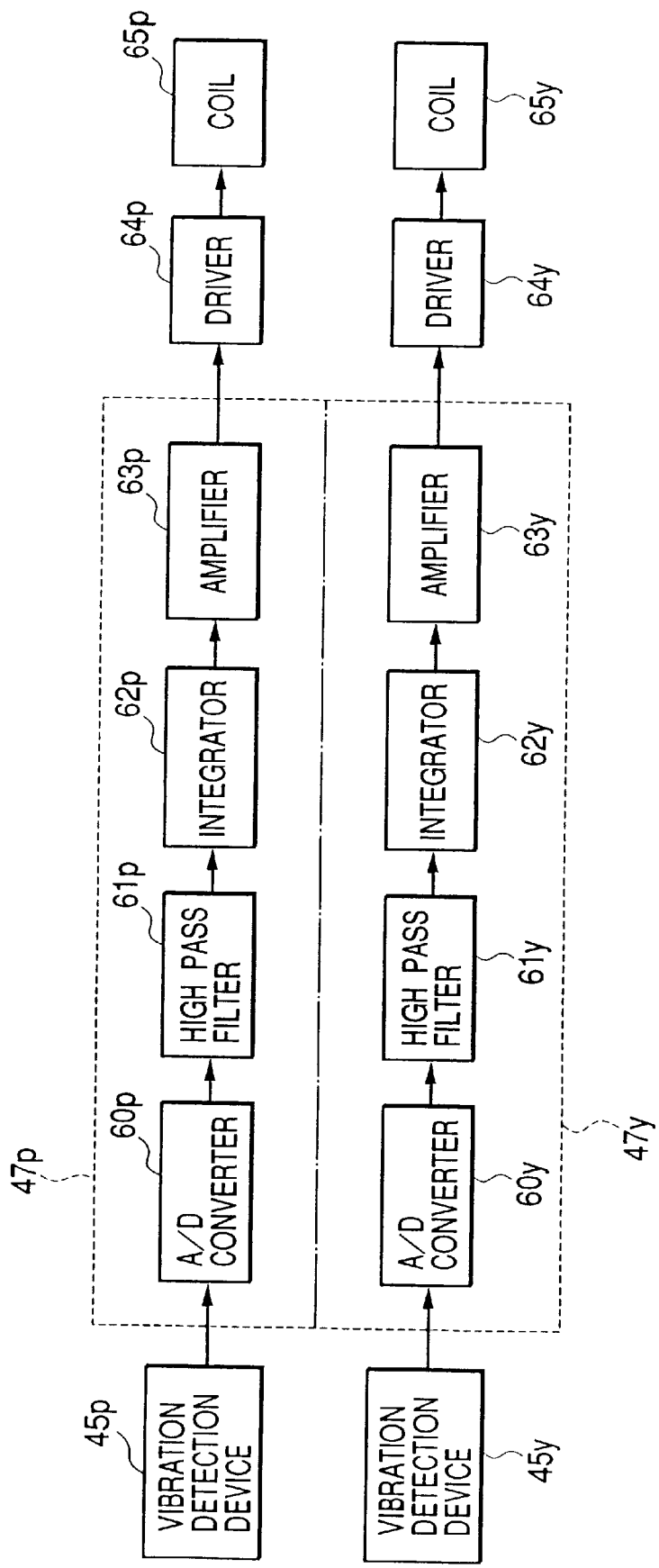
FIG. 6 is a block diagram showing the construction of a calculation apparatus for vibration prevention according to the first embodiment of the present invention.

FIGS. 1 to 7, 8A, 8B and 8C show a first embodiment of the present invention. More particularly, FIG. 1 is an exploded perspective view showing the essential portions of a vibration prevention apparatus, FIG. 2 is a plan view of the apparatus of FIG. 1 (for the sake of explanation, a flexible printed substrate 6 and a keep plate 4 are detached), FIG. 3 is a fragmentary cross-sectional view of the actuator portion of FIG. 2, FIG. 4 is a pictorial view of a compact camera having the vibration prevention apparatus of FIG. 1, FIG. 5 is a perspective view showing the internal construction of the camera of FIG. 4, FIG. 6 is a block diagram showing the details of a calculation apparatus, and FIG. 7 is a conceptual view for explaining the damper effect of an eddy current.

The construction of the vibration prevention apparatus according to the first embodiment of the present invention will hereinafter be described with reference to FIGS. 1 to 7, 8A, 8B and 8C.

A detection system for vibration correction will first be described.

In FIG. 4, vibration correction is effected for the vertical vibration and horizontal vibration of the camera indicated by arrows 42$p$ and 42$y$, respectively, with respect to an optical axis 41. In a camera body 43, the reference character 43$a$ designates a release button, the reference character 43$b$ denotes a mode dial (including a main switch), the reference character 43$c$ designates a retractable stroboscope, and the reference character 43$d$ denotes a finder window.

In FIG. 5, the reference numeral 43 designates a camera body, and the reference numeral 53 denotes a vibration prevention apparatus for freely driving a correction lens 52 in the directions of arrows 58$p$ and 58$y$, and effecting vibration correction in the direction of arrows 42$p$ and 42$y$ in FIG. 4, and the details thereof will be described later. The reference characters 45$p$ and 45$y$ designate vibration detection devices such as angular velocity meters or angular acceleration meters for detecting vibrations about arrows 46$p$ and 46$y$.

In FIG. 6, the outputs of the vibration detection devices 45$p$ and 45$y$ are converted into the driving target values of the vibration prevention apparatus by effecting calculations such as A/D conversion (conversion from analog signals into digital signals) and integrating processes in calculation devices 47$p$ and 47$y$, and are input to coils 65$p$ and 65$y$ to thereby effect vibration correction. In this embodiment, vibration gyros for detecting the vibration angular velocity of the camera are used as the vibration detection devices, and the vibration gyros are driven in synchronism with the closing of the main switch of the camera and start the detection of the vibration angular velocity applied to the camera. Here, the calculation devices 47p and 47y carry out similar processes and therefore, in the following description, only the calculation device 47p will be described.

The calculation device 47p is comprised of an A/D converter 60p, a high pass filter 61p, an integrator 62p and an amplifier 63p encircled by a dotted line. The signal of the vibration detection device 45p is sampled by the A/D convertor 60p, and has its DC bias component superimposed thereon is cut by the high pass filter 62p. The integrator 62p starts the integration of the signal of the high pass filter 62p in response to a half-depression signal of the release button of the camera, converts the angular velocity signal into an angle signal, and inputs it to the amplifier 63p. The amplifier 63p is a conventional PWM (pulse width modulation) duty changing means, and changes coil driving duty in conformity with the driving target value. If a voltage or a current corresponding to a vibration angle is applied to a coil 65p, the correction lens will be driven in accordance with the vibration angle, but PWM driving is desirable for the saving of the consumed driving power of an actuator for driving the correction lens, etc., and the consumed power of the driving transistor of the coil. The output of the amplifier 63p is input to a conventional driver 64p such as a PWM driver, and the output thereof is applied to the coil 65p to thereby effect vibration correction.

The construction of the vibration prevention apparatus will now be described with reference to FIGS. 1 to 3.

While in this embodiment, a vibration prevention apparatus of open control in which the position of the correction lens is not fed back will be described, the present invention may of course be embodied in a vibration correction system of feedback control.

In FIGS. 1 to 3, correction lenses L3 and L4 are fixed to a holder 1. The holder 1 has arms 1a to 1c radially extending therefrom in three directions, and has its position regulated in the direction of a photographing optical axis L while being sandwiched between the sliding surfaces 2a to 2c of a fixed ground plate 2 and a keep plate 4. On the other hand, the holder 1 is supported on the photographing optical axis L by three tension springs 9a, 9b and 9c for movement in all directions on a plane perpendicular to the photographing optical axis L. One end of each of tension springs 9a, 9b and 9c is connected to the ground plate 2. These tension springs 9a to 9c are disposed with a spacial phase difference of 120° in order to minimize the direction dependency of the driving force on the direction of movement of the movable portion A. Also, it is desirable that they be disposed symmetrically with respect to the coils and magnets. Reference numeral 8 designates a yoke fixed to the holder 1. Reference characters 7a and 7b denote permanent magnets of rare earth or the like magnetically coupled to the yoke 8. Reference characters 5a and 5b (corresponding to the coils 65p and 65y of FIG. 6) designate coils adhesively secured to a damper plate 3, which will be described later, and inserted in positioning apertures in the ground plate 2. Also, the coils are electrically connected to a flexible printed substrate 6, which will be described later, with their opposite ends soldered to the latter.

The target driving outputs calculated by the calculation devices 47p and 47y are supplied to actuators comprising the aforedescribed two pairs of opposed magnets 7a, 7b and coils 5a, 5b, and the holder, i.e., the correction lenses L3 and L4, are moved on a plane perpendicular to the photographing optical axis L in a direction opposite to the actual vibration direction by the combined force of the outputs of the two actuators, or the output of an actuator, whereby image blur is corrected.

The keep plate 4 is fixed to the holder 1 by screws with the flexible printed substrate 6, and regulates the position of the holder 1 in the direction of the photographing optical axis. The flexible printed substrate 6 has the soldered pattern of the coils 5a and 5b, and is connected to the camera body side. The damper plate 3 is comprised of a metallic plate of a non-magnetic material, is disposed between the two pairs of coils and magnets of the actuators, and is fixed to the ground plate 2.

The work of the damper plate 3 will now be described.

When the movable portion (indicated by A in FIG. 1) of the vibration prevention apparatus is vibrated by vibration or the like due to disturbance during the carrying of the camera, the magnets 7a and 7b are also vibrated therewith. When these magnets are vibrated, an eddy current is generated in the damper plate 3, comprising a metallic plate of non-magnetic material, as previously described, and magnetic friction is created among the magnets 7a, 7b and the damper plate 3. This magnetic friction works to suppress the vibrations of the magnets.

FIG. 7 shows the work of an ordinary eddy current, and it is known that when a magnet 71 is parallel-moved (in a direction orthogonal to the direction of a magnetic flux) at velocity V (m/s) on a non-magnetic electrically conductive plate 72, a force F is applied (magnetic friction is created) in a direction opposite to the direction of movement of the magnet 71 by an eddy current flowing in the non-magnetic electrically conductive plate 72. The force F is:

$$F = Cv (C = B^2 tA\mu/\rho) \quad (1)$$

B represents the magnetic flux density, t represents the thickness (m) of the non-magnetic electrically conductive plate, A represents the magnetic flux area (d×e') (m$^2$), $\mu$ represents a non-dimensioned attenuation coefficient (1−e$^{-0.15a}$), $\rho$ represents the electrical resistance of the non-magnetic electrically conductive plate ($\Omega$·m), and "a" represents the area ratio (=g×h'/d×e', 2<a <5).

Accordingly, by inserting the damper plate 3, attenuation of the vibration of the movable portion A of the vibration prevention apparatus by disturbance is effected. That is, the movable portion A of the vibration prevention apparatus has a damper effect itself.

Also, from expression (1), the eddy current (force F) generated is larger in a non-magnetic electrically conductive material of lower resistance and, therefore, a metallic plate such as copper or a copper alloy of a high dielectric constant is suitable as the material of the damper plate 3. Also, from expression (1), the force F is proportional to the movement velocity v of the magnet and, therefore, the eddy current is generated more by vibration of a high frequency than by vibration of a low frequency. Therefore, an eddy current is not generated much in the 1 to 12 Hz range, which is a hand fluctuation correction band. Accordingly, it hardly hampers the driving of an ordinary correction lens.

Figure 8A:
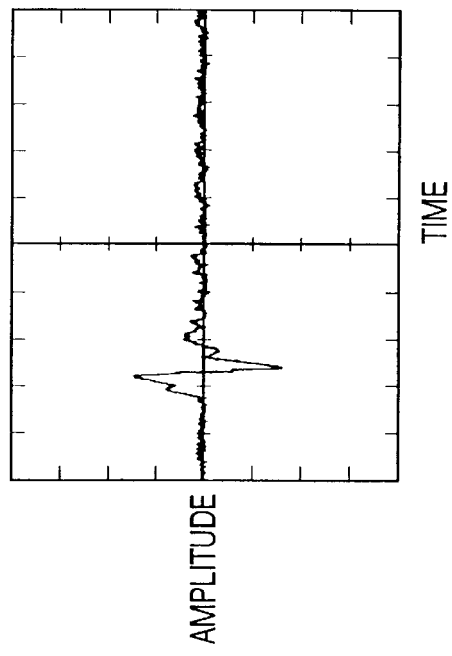
FIGS. 8A, 8B and 8C are graphs for illustrating a damper effect in the first embodiment of the present invention.
Figure 8B:
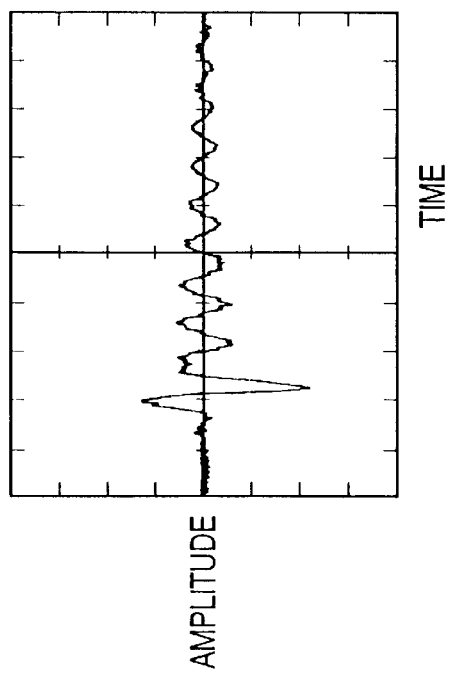
Figure 8C:
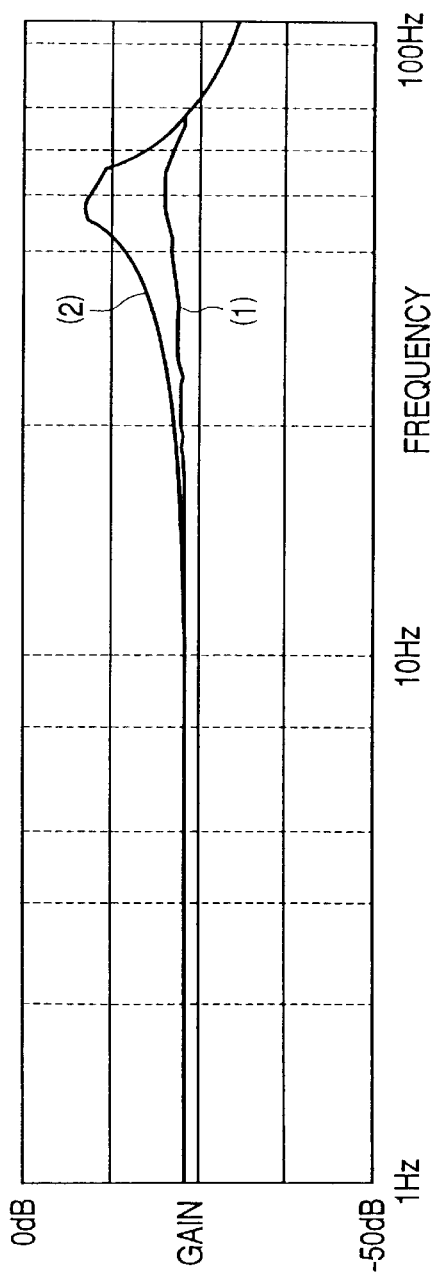

FIGS. 8A to 8C are graphs for explaining the effect of the damper plate 3, and FIGS. 8A and 8B represent the attenuation time of the correction lens (the movable portion A of the vibration prevention apparatus) when a constant vibration is applied to the vibration prevention apparatus, and the axis of abscissas indicates time and the axis of ordinates indicates amplitude; FIG. 8A shows the state in the absence of the damper plate, and FIG. 8B shows the state in the presence of the damper plate. As is apparent from these graphs, the vibration is attenuated within a short time by the damper plate 3.

Also, FIG. 8C is a graph of the frequency characteristic of the movable portion A of the vibration prevention apparatus when the vibration prevention apparatus is driven at a constant amplitude, and the axis of abscissas indicates frequency (Hz) and the axis of ordinates indicates gain (dB), and (1) indicates the state during the presence of the damper plate, and (2) indicates the state during the absence of the damper plate.

It will be seen from FIG. 8C that the gain up to 1 to 12 Hz which is a hand fluctuation correction band scarcely differs between (1) and (2) (that is, the necessary driving force for the vibration correction of the actuator for vibration correction scarcely differs between the presence and absence of the damper plate 3) and the gain in the case (2) of the absence of the damper plate becomes great (that is, the vibration becomes great) from a point exceeding 20 Hz. The vicinity of 40 Hz is the natural frequency of this correction movable portion, and (2) resonates vehemently at a frequency in the vicinity of the natural frequency. On the other hand, it will be seen that in the case (1) of the presence of the damper plate, the amplitude slightly becomes great in the vicinity of the natural frequency, but resonance is suppressed. Accordingly, by putting in the damper plate, the vibration by disturbance can be suppressed without the load of the actuators during correction driving being increased.

(Second Embodiment)

Figure 9:
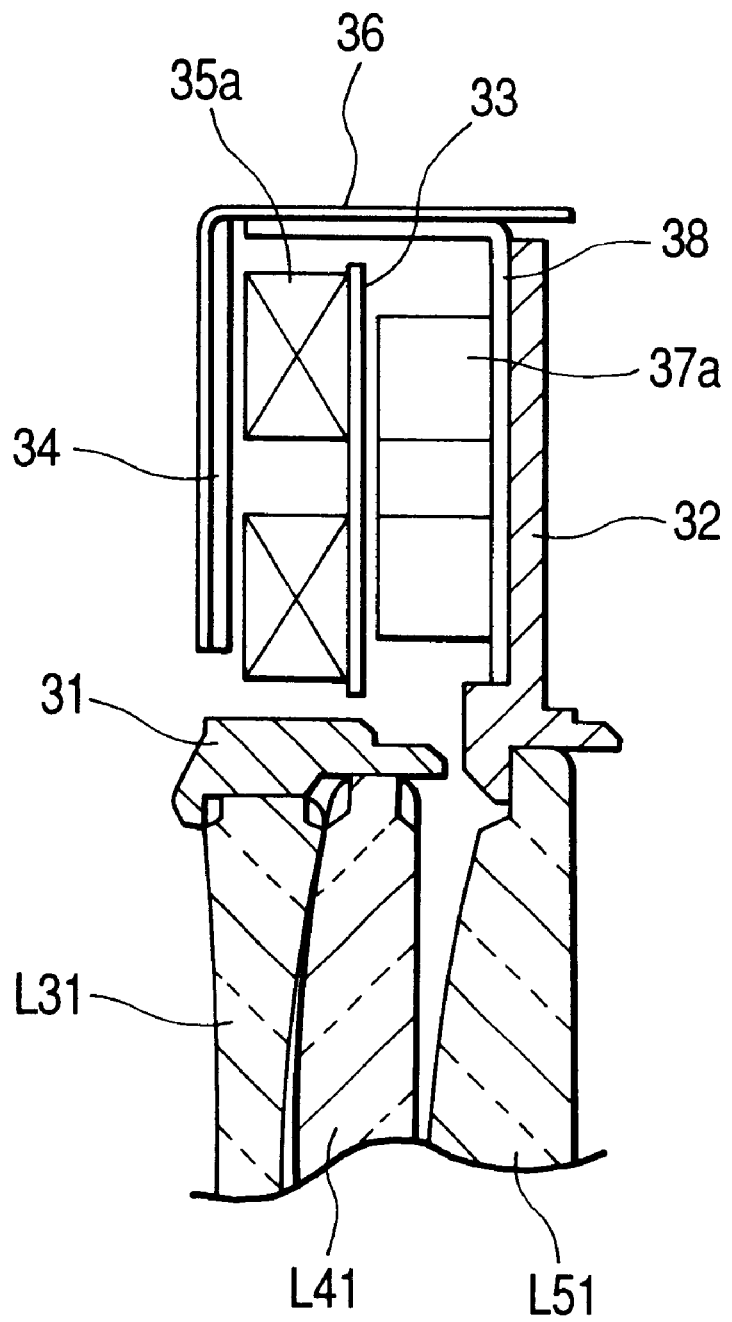
FIG. 9 is a fragmentary cross-sectional view of a vibration prevention apparatus using an actuator for a vibration prevention apparatus according to a second embodiment of the present invention.
Figure 10:
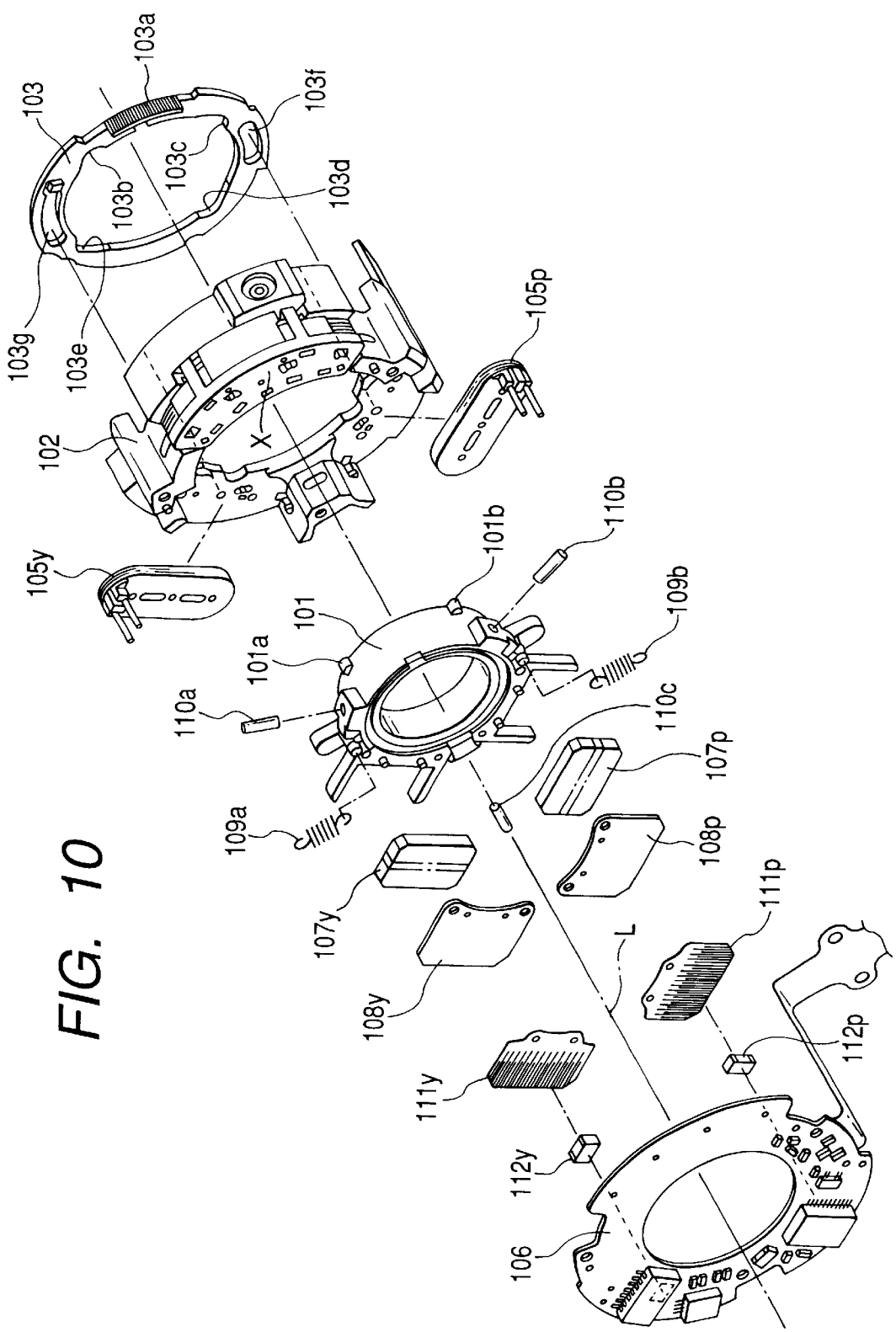
FIG. 10 is an exploded perspective view of a vibration correction apparatus for an interchangeable lens according to the prior art.
Figure 11:
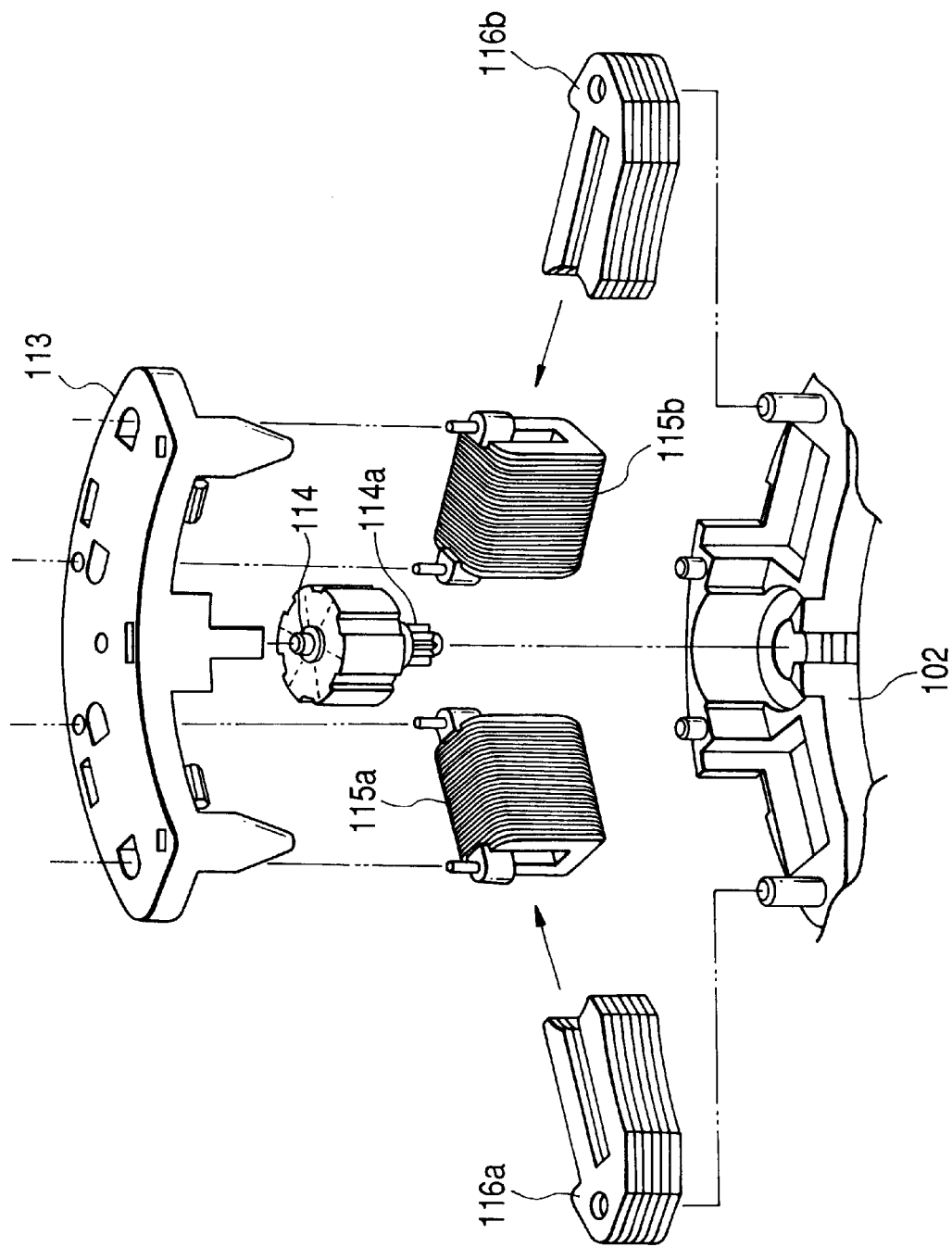
FIG. 11 is a detailed view of the stepping motor unit of the vibration correction apparatus for an interchangeable lens used in FIG. 10.

FIG. 9 is a fragmentary cross-sectional view of a vibration prevention apparatus according to a second embodiment of the present invention, and the differences of FIG. 9 from the cross-sectional view of FIG. 3 are that a magnet 37a (corresponding to 7a in FIG. 3) is fixed to a ground plate 32 through a yoke 38, and conversely a coil 35a (corresponding to 5a in FIG. 3) is fixed to a holder 31 through a damper plate 33. Also, a keep plate 34 is formed of a metal which is a magnetic material, also has the work of a back yoke, and forms a closed magnetic circuit together with the yoke 38.

That is, in this second embodiment, with the coil as the movable side, the movable portion of the vibration prevention apparatus is moved to thereby effect vibration correction, the damper plate 33 is moved with the coil, and the magnet and the damper plate effect relative motion to thereby generate an eddy current in the damper plate so as to obtain a damper effect.

According to each of the above-described embodiments, the damper plate which is a non-magnetic electrically conductive plate is inserted between the coils and magnets of the actuators for the vibration prevention apparatus, whereby magnetic friction is created among them by eddy currents generated in the damper plate by the relative motion of the damper plate and the magnets, and vibration due to disturbance or the like can be suppressed (it becomes possible to make the movable portion itself of the actuator into a damper).

Also, because an eddy current is utilized, the damper effect is not created much for frequencies in a practically used area (in order of 1 to 12 Hz) driven in vibration prevention, and the damper effect is displayed more for vibrations of higher frequencies. Therefore, the damper effect can be obtained without the driving force during vibration prevention driving being increased. This is best suited for the actuator for vibration prevention.

Accordingly, vibrations during times other than during vibration prevention driving (for example, vibration during the transportation of the camera) are also attenuated by the vibration prevention apparatus itself. Therefore, a lock member or the like for locking the movable portion of the vibration prevention apparatus becomes unnecessary, and downsizing and reduced costs can be achieved.

Vibrations of high frequencies during vibration prevention driving (such as the shock during the operation of a shutter) can also be attenuated and therefor, highly accurate vibration prevention driving becomes possible, and even if the position of the correction lens is not fed back, sufficient correction accuracy is obtained in the hand fluctuation correction of the compact camera class, and it becomes possible to also eliminate a sensor for detecting the position of the correction lens, electrical parts, and a reflecting plate accompanying it.

Also, the coils are fixed to the damper plate, whereby the control of the gap between the magnets and the coils becomes easy, and it becomes possible to greatly reduce the size of the gap due to insertion of the damper plate.

(Modifications)

While in the above-described embodiments, the damper plate is constituted by a single member for the two actuators, independent damper plates may be provided for the respective actuators.

Also, while the above embodiments have been described with respect to the actuators for the vibration prevention apparatus of a camera, the present invention can be applied not only to a camera, but also to other vibration prevention apparatuses.

As described above, there can be provided a vibration prevention apparatus of which the enlargement of the size and complication can be prevented and of which vibration can be suppressed with good accuracy to thereby prevent damage of the apparatus.

What is claimed is:

1. A vibration prevention apparatus comprising:
   a holding member that holds an optical unit for correcting image blur;
   a support member that movably supports said holding member;
   a coil member provided on said holding member;
   a magnet member provided on said support member, and disposed in opposed relationship with said coil member; and
   a member disposed between said coil member and said magnet member, and having electrical conductivity,
   wherein when said coil member is electrically energized, said holding member is driven relative to said support member.

2. A vibration prevention apparatus according to claim 1, having an optical axis, and wherein said holding member is biased against said support member by a plurality of biasing members, and said optical unit is maintained about a center of the optical axis.

3. A vibration prevention apparatus according to claim 1, wherein said member having electrical conductivity is formed of a non-magnetic material.

4. A vibration prevention apparatus according to claim 1, wherein
   said member having electrical conductivity is a metallic plate.

5. A vibration prevention apparatus according to claim 1, wherein said member having electrical conductivity is fixed to said holding member.

6. A vibration prevention apparatus comprising:
   a holding member that holds an optical unit for correcting image blur;

a support member that movably supports said holding member;

a magnet member provided on said holding member;

a coil member provided on said support member, and disposed in opposed relationship with said magnet member; and a member disposed between said coil member and said magnet member, and having electrical conductivity, wherein when said coil member is electrically energized, said holding member is driven relative to said support member.

7. A vibration prevention apparatus according to claim 6, having an optical axis, and wherein said holding member is biased against said support member by a plurality of biasing members, and said optical unit is maintained about a center of the optical axis.

8. A vibration prevention apparatus according to claim 6, wherein said member having electrical conductivity is formed of a non-magnetic material.

9. A vibration prevention apparatus according to claim 6, wherein said member having electrical conductivity is a metallic plate.

10. A vibration prevention apparatus according to claim 6, wherein said member having electrical conductivity is fixed to said support member.

* * * * *

UNITED STATES PATENT AND TRADEMARK OFFICE
CERTIFICATE OF CORRECTION

PATENT NO. : 6,374,049 B1 Page 1 of 1
DATED : April 16, 2002
INVENTOR(S) : Nobuhiro Fujinaga It is certified that error appears in the above-identified patent and that said Letters Patent is hereby corrected as shown below:

<u>Title page,</u>
Item [56], References Cited, U.S. PATENT DOCUMENTS: insert
-- 2001/0014213     A1     *     Terada     396/55 --.
FOREIGN PATENT DOCUMENTS: "JP 0014213     8/2001" should be deleted.

<u>Column 1,</u>
Line 22, "a" should read -- a photograph --.
Line 23, "photographable" should be deleted.

<u>Column 7,</u>
Line 60, "(in" should read -- (in the --.

Signed and Sealed this

Third Day of September, 2002

Attest:

*Attesting Officer*

JAMES E. ROGAN
*Director of the United States Patent and Trademark Office*